(12) United States Patent
Treadwell

(10) Patent No.: X4348
(45) Date of Patent: Mar. 2, 1826

(54) PRINTING PRESS, POWER

(76) Inventor: Daniel Treadwell

The schedule referred to in these Letters Patent and forming part of the same, containing a description in the words of the said Daniel Treadwell himself of his improvement in the Machine for printing called the Power Printing Press.

To all persons to whom these presents shall come, Daniel Treadwell of Boston, in the Com=monwealth of Massachusetts Engineer, sends Greeting: Be it known that I the said Daniel Treadwell have invented, constructed and applied to use a new useful improvement in printing whereby I obtain all the operation necessary for striking impressions from a sin=gle rotary motion which improved machine I call the Power Press and which I proceed to describe in this & the following sheets.—

I wish it to be borne in mind by the reader, that this Machine has a general resemblance in many parts, such as the frames platen &c. to the common wooden press. As these constitute no part of my invention, no further description of them is necessary, than to show the manner in which they are altered, in form, to adapt them to my improvements. In order to make my inven=tion more clearly understood I shall describe the whole machine in divisions made from the operations which are performed in the following order.— 1st The frame—2d The parts producing the impression. 3d Parts connected with running the form of types from end to end of the rail way alternately inking & taking an impression. — 4th. The parts by which the paper is conveyed on to the types and raised from them after it is printed. — 5th. Inking apparatus. — 6th. Throwing out of gear.

I use the terms East, West, North & South to designate the aspects of the parts or directions in which they are placed in regard to the centre of the whole, which is a vertical line drawn through the centre of the platen. I suppose the pressman or persons who is to put on the sheets, to stand on the South side of the press looking to the North, having the East end of the press to his right hand & the West end to his left. — 1st. - The body resembling that of the common press) consists of two cheeks & two beams, which I call the top & bottom beams, properly secured to the cheeks. These beams answer to what are called the cap, the head, the summer & the winter in the compress. From the west side of each of the aforesaid beams I run out a plank (at right angles with the beams) 6 feet long, 1 foot wide, & 3 inches thick; the sides of the plank being parallel with the plane of the horizon; these are properly secured to the beams by bolts or tenons. I call them the tail pieces. They are supported from the floor of the room at their ends to keep them from sagging & 2 ½ feet from the beams 2 studs are put in running vertically from one tail piece to the other. These studs are both an equal distance from the beams and 4 inches from each other.

2nd. I fix into these tail pieces, at the distance of 4¾ feet from the beams, a vertical shaft of cast iron, 4 inches square having gudgeons at each end, which turns in boxes fixed into the tail pieces, this I call the Cam shaft. – The lower end of this shaft is coupled just below the lower tail piece to another cast iron shaft of the size of the former, which passes from a proper step or box in the room immediately beneath that in which the presses are worked. This I call the main shaft. – I fix upon the same shaft between the tail pieces and at the distance of 9 inches from the under side of the upper tail piece, a cast iron Cam, the face of which at its middle part is 13½ inches distant from the center of the shaft. The face of this Cam is an arc of 120 degrees of a circle whose radius is 7¼ inches; hence the eccentricity of the Cam is 2 inches. – A horizontal slide of cast iron (in the end of which next to the Cam, is a friction roller) passes from the face of the Cam over a cross piece fixed between the studs before described (as placed between the tail pieces) to a point directly over the platen & under the top beam; and equally distant from both. Here the slide is united to a toggle joint. – This joint is made of two pieces of Cast iron, the lower end of one of which is united to the top of the platen, by a joint, & the top end of the other is united by a joint, with a cast iron plate placed upon the under side of the top beam. – The two pieces are united at their other ends by a joint, & are there connected with the slide before described. – When the slide falls back (the cam having passed it) the toggle joint crooks westward, the two pieces of which it is composed pointing in some degree towards the cam. This permits the platen to rise (as will hereafter be described.) But when the Cam presses the slide Eastward, the joint is brought nearly straight, and the platen is consequently made to descend upon the types to produce the impression. A pin is fixed in the slide which strikes the cross piece between the studs, to prevent it from passing Westward too far, when the Cam leaves it. The platen is hung between the cheeks of the body of the press in the following manner. Two stout pieces of Cast iron which I call the platen guides are bolted, horizontally one upon the inner side of each of the cheeks of the press frame. These guides are as long as the platen from East to West & their lower edges are nearly as low as the face of the platen. A small roller runs along the East edge of the platen, its gudgeons running in boxes fixed upon the East ends of the platen guides. This is to prevent the tympan from rubbing the edge of the X platen. Two cast steel arms or gudgeons ½ inch in diameter are fixed to the platen near its face and near its West side, these arms pass from the platen into vertical slots or oblong holes, made in the sides near the West end of the platen guides. When the platen is in its place and drawn upwards by the counter-balance (to be hereafter described) its face is not intended to be horizontal, but to incline upwards from the West to the East about 4 degrees.

A common knowledge of the force required to produce an impression by a common press will show the dimensions required for the parts as here described.

The platen is counterbalanced by weights fixed to levers upon the upper side of the top beam & connected with the platen by rods passing through holes in the top beam & united with the platen between the centre of gravity, and its arms or gudgeons. The weight of the counter-balance should be enough to keep the platen always pressed against the toggle joint.

The operation of these parts, (concerned in producing the impression) is as follows:- The cam shaft being made to revolve from East to South the cam strikes the roller in the end of the slide which being prevented from passing southward by a friction roller on the south stud between the tail pieces, the slide is wedged or pushed Eastward by the Cam. This tends to straighten the toggle joint & consequently to make the platen descend, (the bed & types & sheet to be printed being by the general running of the press to be hereafter described now under the platen) the impression is made. From the manner of counterbalancing the platen (the weight acting between the centre of gravity of the platen & its gudgeons or arms at its West side) the East edge of the platen descends first, when this touches the types & is thereby resisted, the West side descends, the gudgeons slipping down into the slots, in which they are hung. The whole descent of the platen should be its East edge about 2 inches, and its West edge about ½ an inch. After the full part, or centre of the Cam, has passed the slide, the reaction of the beam and other parts together with the counterbalance of the platen, causes the platen to rise as the cam passes onward, and the toggle joint to crook backwards; the slide following the eccentricity of the cam until the pin strikes the cross piece before described, between the two slides. This leaves the bed, types & printed sheet free to be passed from under the platen.

3rd The coffin, stone & carriage, which together I call the bed on which the form of types is placed is put on proper ribs which I call rail ways & which answer to the carriage and the ribs of the common press, which are so placed as to direct the bed under the platen & from thence horizontally about 3½ feet to the Eastward. The motion of the bed and types from East to West, & from West to East, is produced by the following Machinery. At the distance of 1½ foot West of the beams of the press, I place a round shaft vertically 4½ feet long and 1½ inch diameter. This I call the verge, its lower end runs in a step on the floor of the room, properly connected to the under part of the press frame. The verge passes upwards, through the lower tail piece, a little to the North of its centre line, so as to clear the slide; and its top gudgeon runs in box fixed in the upper tail piece. It is necessary that this verge in the performance of its operations, should be turned about 2¼ revolutions in one direction, 2¼ revolutions in an opposite direction, and then stand motionless during a space of time equal to that previously taken up by the performance of revolutions. To accomplish this effect, I put two Mitre cog wheels of 8 inches diameter upon the verge below the lower tail piece (the upper side of the upper wheel being two inches below the tail piece) These wheels are placed 5 inches apart, and gear, one into the upper limb and one into the lower limb, of a vertical wheel, which I call the jaws wheel, of like size with themselves, which is fixed upon a proper shaft which runs from this vertical wheel, in such a direction, that if produced, it would pass through the centre of the main shaft. The wheels upon the verge are prevented from moving up and down by proper collars; but they can move round freely upon the verge, unless prevented by the means to be hereafter described. It will be seen that the jaws wheel turning in one direction, drives the wheels upon the verge, which are geared to it, in opposite directions. Upon the verge between the wheels before described, I put a chuck or clutch, occupying, within 2 inches, the whole space between the verge wheels. This chuck can be moved up & down upon the verge, but is fixed by <u>wings to</u> the verge so that it cannot turn round without carrying the verge with it. There are two pins in each of the verge wheels diametrically opposite to each other, and two inches from the centre of the verge. The pins which are in the top wheels project from the wheel downwards, 3/4 of an inch, & those in the bottom wheel project upwards 3/4 of an inch. There are slots made in the top, and in the bottom of the chuck to receive these pins. Round the middle of the chuck a groove is turned ½ an inch broad & ½ an inch deep, to receive two knobs or projections upon the end of a lever, (which I call the locking lever) by which the chuck may be moved up and down as shall be required. This lever passes from the chuck horizontally 6 inches, below the bottom of the under tail piece, in a south direction, curving round the bearing of the shaft of the [illegible] wheel; from which it runs Westerly, to a point distant 3½ feet from the under beam, and 2¼ feet from the main shaft and ¾ of a foot from a vertical plane running East & West through the centre of the tail pieces. The locking lever is made of cast iron, and is about 2 inches square at the fulcrum, but tapers towards its ends. A notched stud of cast iron is fixed to the under side of the bottom tail piece, & passes downwards so as to embrace the locking lever on its two sides, at its middle. A pin passed through the legs of this stud and through the lever horizontally from North to South, serves as a fulcrum for the lever to act upon. A cast iron wheel of 18 inches diameter, and 4½ inches thick, is fixed upon the main shaft 6 inches below the bottom tail piece. A groove ¾ of an inch square is cut into the periphery of this wheel. To understand the direction of this groove, it will be necessary to conceive the circumference of the wheel is divided into 360 degrees.

Then supposing the first point of the division to be on the South side of the wheel; the groove commencing here in the middle of the wheel runs East in a horizontal direction round 55° of the wheel. It then runs upwards at an angle of 45° the distance of 1/4 inch and through 6° of the division. It then runs horizontally to the North through 140° More. It then turns down at an angle of 40 degrees and passes the distance of 2 inches running through 13° of the division. It then runs horizontally round the wheel through 140° where it turns upwards and united to itself at the point from whence (in this description) I have supposed it to commence
making one uninterrupted, but crooked channel
round the whole circumference of the wheel.
A lever which I call the groove lever lays along
on the south side of the locking lever to which it
is fixed by a proper joint 5 inches West of the
fulcrum of the locking lever. — This joint permits
the groove lever to move in the plane of the ho-
rizon about 5 degrees. The Western end of the groove
lever passes by the Western end of the locking lever,
turning at an angle directly across this last,
towards the centre of the groove wheel, the groove
of which it enters passing nearly to its bottom. The
Eastern end of the groove lever is produced hor=
izontally, under the lower tail piece, until it
nearly meets the West side of the lower great
beam. A small iron lever is fixed to the great
beam in the horizontal plane of the groove lever
by a round pin through its middle part. This
lever is crooked at its middle, and one arm
points to the South, while the other points di=
rectly upwards. From this last part, a rod
or chain passes to the South to attach it to the
groove lever, and a weight is hung from its
other arm, by this means the East end of the
Groove lever is always pulled by the weight to
the South, and the West end kept in the groove.
Under the groove wheel, and fixed upon the main
shaft, is a level cog-wheel, the cogs pointing
upwards, $2\frac{1}{2}$ feet diameter, and having 132
teeth. This is a horizontal wheel and it drives
a vertical Jack having 22 teeth, which is fixed
upon the West end of the shaft of the fanwheel.

The shaft of the pawn wheel runs in proper
boxes fixed in studs of cast iron, depending from
the under side of the lower tail piece to which
they are bolted. — I fix upon the lower end of
the verge, that is between the verge wheels and the
floor a piece of wood which I call the lower eccentric
spiral pulley. Upon this is wound up a leather
strap which draws the bed and types from West
to East. — The length of this spiral pulley is about
$6\frac{1}{2}$ inches, so that a strap 2 inches wide, can
make about $2\frac{3}{4}$ turns round it without winding
one ply over the other. The form of the face of
this spiral, or part which looks towards the ho-
rizon in all directions, and which is covered
by the strap when wound up is somewhat
cylindrical, having generally a radius of about
$3\frac{1}{4}$ inches. An exception however to this radius,
and, consequently to the cylindrical form hap-
pens at the parts which I call the dead points,
which are, first, the lower North point (the spi-
ral being in its place in the machine) & again
$2\frac{1}{4}$ rounds of the spiral above this. At these
points the spiral is cut away (in an easy curve)
for about $\frac{1}{4}$ of a round, so that the strap when
it is wound up approaches to within 1 inch of
the centre of the verge. An edging of sheet
iron is put upon the spiral, between the turns
so as to prevent the different plies of the strap
from interfering with each other. This iron
looks somewhat like the head of a screw. A
leather strap 2 inches wide and 12 feet long
nearly, is fixed to the spiral at its lower
dead point. The strap is then passed Eastward and upwards until it reaches a vertical pulley which I fix upon a horizontal shaft, the gudgeons of which run in boxes fixed to the inside of the Rail ways near their East ends. The strap is passed from below upwards over this pulley from which it is passed horizontally to the West until it meets the bed (which is now supposed to be under the platen at the West end of the rail way.) The strap is then fastened to the East side of the bed. I likewise fix another eccentric spiral pulley upon the upper part of the verge between the two tail pieces.

The lower part of this spiral is upon a horizontal line with the top of the lower beam. This spiral is of the same dimensions and shape as the lower one only that the dead points, or parts cut off so that the strap may approach near to the verge are in the upper spiral (when it is fixed upon the verge) diametrically opposite to those of the lower spiral. A leather strap 2 inches wide is fixed to the upper spiral about one half of a turn above the upper dead point.

It is then wound round the spiral down to its bottom making about 2¾ turns. It is then passed from the south side of the spiral to the East, and fixed to the bed (which is understood to remain directly under the platen.)

With the preceding apparatus the motions which I have before declared been necessary for the verge to perform & the moving of the bed from end to end of the rail way are performed as follows. Let the main shaft be turned in the direction from East to South. By the connexion of the wheel work the two wheels upon the verge
are driven round, the top one from East to South
and the bottom one from South to East. Suppose
now, that the end of the groove lever, is in the
shortest, of the horizontal parts of the groove,
that the locking lever is therefore horizontal
in direction, and the chuck, between the
verge wheels equidistant from each of these wheels
and consequently not locked by the pins to either
of them. On the further revolution of the
groove wheel, the part of the groove which crooks
upwards, arrives at the end of the groove lever
and forces the West end of the locking lever
upwards and, consequently its East end down =
wards which carries the chuck with it. The
pins in the lower verge wheel, then fall into the
slots in the chuck, the chuck is carried round
by the lower verge wheel and carries with it the
verge. This carries the lower dead point of the
twin eccentric spiral pulley, to which the lower
strap is fixed, from North to West, winding up
the strap, and consequently pulling the bed from
West to East, the upper spiral unwinding its
own strap as fast as the lower spiral winds
up. Having made 2 1/4 revolutions the groove
will have arrived at the part which crooks
downwards & passing on will force the West
end of the locking lever downwards, & its East
end upwards. This carries the chuck on the
verge up, releasing the pins of the lower wheel,
and locking into those of the upper one, which
turning in an opposite direction, reverses the
direction of the revolutions of the verge. By this operation the winding and unwinding of the straps is also reversed so that the bed which has been carried about $3\frac{2}{12}$ feet to the East, is, now by the winding up of the upper strap returned from East to West & carried under the platen.— The verge having made $2\frac{1}{4}$ revolutions in this new direction, the last angle of the groove will have arrived at the end of the groove lever which will force the West end of the locking lever upwards & the East end downwards far enough to slip the chuck from the pins of the upper verge wheel. The verge then rests & also the bed and its appendages, until the shortest of the horizontal parts of the groove has passed over the end of the groove lever which by my divisions is equal to $\frac{53}{360}$ ths ″ of a revolution of the groove wheel.— The same operations are then repeated.

All these motions have a certain relation to each other in the order of succession in which they take place, and likewise a relation to the time in which the impression is given.— In order to produce the motion in their regular times and relations it is necessary to place the groove wheel upon the main shaft in such a manner that the shortest horizontal part of the groove, may just arrive at the end of groove lever at the moment that the cam first presses upon the impression slide. And it is likewise necessary to lock the teeth of the pinion wheel to those of the verge wheels, in such parts of their circumference, that the pins in the verge wheels shall be at the proper place to slip into the slots in the chuck of the verge when the chuck is moved up & down by the operation of the apparatus attached to it.—

4th. The paper is conveyed to its place for the impression by the following apparatus.— I make two slides, which I call the frisket slides, 4 1/2 feet long, 1 inch wide & 3/8 inch thick of iron. These I place horizontally with the edges looking up and down, one upon the North & one upon the South side of the bed. Two pieces of iron (having an oblong hole in each) being fixed to the bed to receive the slides. These slides can thus slip in the holes or boxes in which they are placed 2 1/2 feet from East to West or contrary-wise. To the West end of each of these slides, I rivet two pieces of iron 3 1/4 inches long 1 inch wide and 3/8 inch thick. These pieces point upwards from the slides at a right angle, and their tops rise 1 1/2 inch above the upper face of the bed. I make through each of these pieces of iron 1 inch above the face of the bed, a hole 1/2 an inch in diameter.— Having made a frame of iron which I call the frisket and which is of the size & shape of the frisket of a common printing press, I fix to two of its corners on the same side, two gudgeons about 2 inches long. These I put into the holes before described in the ends of the slides.— If we now suppose the slides run to the East until their end pieces strike the irons on the West side of the bed, and (supposing the form of types to be in its place upon the bed) the frisket can now be let down so as just to cover the chase, the several sides of which are near and parallel to the corresponding sides of the frisket.

To each of the East corners of the frisket, I connect to the North & South a piece of iron 3 inches long and 3/8 inch square, which I call the lifting studs. I likewise run from the
East to the West sides of the frisket, across the middle
of its open rectangle, a strip of iron to which I fix
two points, which point upwards, of a proper size
for register points. I fix to each cheek of the press
frame upon the North side and 3/4 of an inch
above the plane of the face of the bed, a bar of iron
2 3/12 feet long, 1 inch wide and 3/8 of an inch thick. These
bars run North, horizontally 6 inches, they then
turn upwards, at an angle of [illegible] degrees & their
North ends rest upon the top of the roller jambs
(which will be hereafter described) I unite these
two bars together by two cross bars running from
North to South upon their under sides. The most
Westerly of these cross bars is at least 10 inches from
the cheeks of the press. The rectangular space
between the four bars, thus arranged, I cover by a
sheet of iron rivetted to the upper side of the cross
bars. The thing here described I call the apron.
As it requires to be removed from the press sometimes,
it is not fixed permanently to the cheeks, but so
that it can be removed. I connect to the West
side of the frisket, a folded or doubled cloth of
cotton or like fabric 26 inches square. The two cor=
ners of this which remain loose after it is fixed to
the frisket, I raise vertically upwards, and stretch
apart by a stick. I then unite each corner to lines
which are passed over pulleys near the ceiling of
the room & their other ends tied to small weights
2½ feet below the pulleys. I put a blanket or blan=
kets between the folds of the tympan. The frisket
slides must be prevented from running to the East
further than to bring their West ends clear of the East side of the platen, by two posts, which support the East ends of the rails. These posts run up above the rails $4\frac{1}{4}$ inches, and near the top of each a vertical pulley is attached. I pass a line $2\frac{8}{12}$ feet long, over each of these pulleys, and having fixed the West end of each line to the East end of a frisket slide on the side of the press corresponding with the line I fix to the other end of each line a weight of 7 lbs.

The weights hang near the floor when the frisket slides are in their most Easterly position to which the weights constantly tend to draw them. The frisket must be covered with stout paper and divided into pages in the usual way. The lifting studs (of the frisket) are made to run upon the top side of the side pieces of the apron. — From the preceding description it will be perceived that when the frisket is in its most Easterly position and laying over the apron, if a sheet of paper be laid upon it, when the bed is carried from East to West, it will carry the frisket and sheet to be printed with it under the platen, and the sheet will there, by the operation of the platen which has already been described, to be printed or impressed, after which, when the bed returns from West to East the weights attached to the frisket slides, will draw the slides together with the frisket and sheet, to the East until the East ends of the slides strike the posts before described, at the East end of the rails. The frisket as it slides Eastward on the top of the apron lifts the sheet from the types. The sheet being removed and an unprinted one put upon the frisket, the operations before described are repeated. The frisket moves from East to West $1\frac{10}{12}$ feet, but the bed moves $3\frac{9}{12}$ feet, consequently the frisket is left motionless upon the top of the apron a sufficient time to exchange the sheets.

5th The inking apparatus.– I fix upon the outside of each rail $1\frac{5}{12}$ foot East of the lower beam, a piece of Cast iron which I call a jamb. The rails being but $2\frac{1}{3}$ feet apart, on their outsides it is necessary that the jambs should run out horizontally each way 2 inches, to permit the bed to pass between their upper parts. They then turn up at a right angle & rise vertically 12 inches. They are 12 inches wide from East to West, and ½ an inch thick. I put between the jambs (their axis running North and South) four rollers, three of which are 3 inches in diameter & covered with skin, or with composition, such as is in common use for inking rollers in England & the other is made of wood and $2\frac{1}{4}$ inches in diameter. Two of these soft rollers lay side by side, without touching each other, their under sides being at such a height in the jambs as just to press lightly upon the face of the types, when the bed & form are passed under them. The other soft roller is placed directly over the most Easterly of those before described, but so high as not to touch them.

The wooden roller is placed directly over the space between the lower rollers so as to be in contact with all the soft rollers. The gudgeons of all the rollers run in proper boxes screwed to the jambs. The rollers occupy the Western part of the space between the jambs. I fix upon the wooden roller near its North end a cog-wheel the diameter of which measured upon the dip line of the cogs is just equal to the diameter of the roller. This wheel is driven by another small spur wheel (nearly under it) which turns upon a pin fixed upon the inside of the North jamb. The last described wheel is turned by a rack 5 feet long, the teeth of which point upwards, fixed upon the North side of the bed. The rack is fixed by such a part of it to the bed, as to bring its East end nearly under the wooden roller, when the bed is under the platen, and its West end when the bed is in its most Easterly position.— The ink is supplied from a fountain which has the appearance of an iron box 2¼ feet long, and 2 inches deep and 3 inches wide, the top & West side being taken off and an iron roller supplying the place of the West side.— This iron roller is 2 feet long between the gudgeons and 2 inches in diameter and it is placed against the iron box or body of the fountain so that a horizontal plane, passing through its axis will intercept the bottom of the box or fountain. The gudgeons of the fountain roller here described revolve in the ends of the iron box or body of the fountain, a cap upon their West sides keeping them in place.

These ends pass downwards below the roller 4 inches near the bottom of each, an arm is fixed passing outwards both ways. The ends of these arms are formed into gudgeons which are placed in holes, one in each jamb, & constitute the axis on which the fountain can be rolled through a small arc from East to West— thus the fountain occupies the space between the jambs East of the inking rollers, & it is put at such a height between the jambs, that a plane drawn hor=izontally through the axis of the uppermost inking roller, will pass through the axis of the fountain roller.— The space between the West side of the fountain roller, and the East side of the upper inking roller is (when the fountain is back or in its most Easterly position about 1 inch, the rollers laying parallel
to each other. The fountain thus described is
like those used upon the English printing machine
invented by Mr Rutt. I fix upon the South end
of the gudgeon of the fountain roller which projects
beyond the end of fountain to receive it a ratched
or rag wheel. A proper pall or dog hand is fixed
upon the South jamb so as to fall into the notches
upon the top of the rag wheel. The standing
parts of the notches upon the top of the rag wheel
look towards the West, and the notches slant to
the East in the direction of the chord of an arc.
An iron bar is firmly fixed to the arm which
runs from the South end of the fountain to the
South jamb; this bar runs from the arm down=
wards, nearly to the plane of the top of the rails.
An iron ~~iron~~ slide passes from the above described
bar at its West side and near its lower end,
Westerly through the lower South corner of the
open rectangular space comprised between the
cheeks and beams of the press frame, to the West
side of the lower beam & projecting West of it
about 2 inches. The West end of this slide is covered
by another iron bar which I call the vertical hinge
which passes from it downwards, & is fixed by a
hinge point to the press frame near the floor.
Another iron bar which I call the horizontal
hinge, is fixed by a screw bolt passing through its
end, and likewise through the vertical hinge
near its middle from whence the horizontal
hinge passes Northerly over the top of the lower
tail piece to near the end of the lower beam of
the frame to which it is fixed by a hinge point.

A slide runs from the West side of the horizontal hinge just over the upper side of the lower tail piece, until it almost reaches the Cam Shaft. A steel pin projects from the Cam Shaft in a line directly under the Cam and at such a part that when the Cam revolves the pin will push the last described slide to the East. The slides are prevented from moving laterally by proper boxes fixed upon the lower beam and the lower tail piece.

An important part of the inking apparatus is the revolving table. I fix to the East side of the bed, a light frame of iron which runs out from the bed 1¼ foot to the East. — The upper side of the frame is 2½ inches below the face of the bed from which it is properly braced. The revolving table is 28 inches in diameter. It is made of wood and its upper face is a circular disk. A round iron axis 1 inch in diameter passes downwards from its centre 6 inches. This axis passes through a vertical hole near the Easterly part of the frame just now described as fixed to the bed. A shoulder is turned upon the upper part of the axis which rests upon the upper side of the frame, & prevents the tables from falling down too low. When the table is in place its upper face should be horizontal, & just as high as the face of the types upon the bed. A light rag wheel 18 inches in diameter is fixed upon the under side of the revolving table 1¼ inch below it and parallel and concentric with it. A dog hand or catch is fixed to one of the rails of the prop frame by a hinge joint in such a place and position that it will catch into the teeth upon the side of the rag wheel when the bed and consequently the revolving table is brought into its most Easterly position. The dog hand or catch is brought so as to catch the teeth by a spring and prevented from passing too far by a stop screwed upon the press frame.

To understand the manner in which the inking apparatus operates, we will suppose that the fountain is filled with ink, that the roller and top of the revolving table are covered with a thin coat of it, & that the Cam shaft is made to revolve & consequently the bed & types, to take up a reciprocating motion upon the rail way. When the steel pin in the Cam shaft, strikes the slide (belonging to the inking apparatus) and shoves it to the East. This brings the top of the inking fountain to the West, but as the pall upon the South jamb prevents the top of the rag-wheel on the fountain roller from moving with the fountain; the fountain roller is constrained to turn round a few degrees upon its axis. By this means some of the ink which adheres to the roller, is carried with it out of the fountain in a thin sheet (the remainder being) kept in the fountain by the iron bottom. During this operation the fountain, passing to the West, brings the fountain roller in contact with the uppermost inking roller & in this manner the inking rollers are supplied with ink. When the bed begins to pass to the Eastward the inking rollers by reason of their connexion by the Cog-wheels, as before described, with the rack, are made to revolve, the undersides of the two lowermost ones passing towards the East. They are at first in contact with the revolving table, but after the bed & table have passed over part of the rail-way they come in contact with the types & impart some of the ink from their surface to the face of the letter, and a still further quantity when the bed passes from East to West. When the bed & table
are at their most Easterly positions, the catch, which
has been described as hinged to the rail way, catches
into the rag-wheel fixed upon the under side of the
revolving table and when the table returns to the West
this causes it to revolve in a greater or less degree.—
By this means when the table comes again in contact
with the inking rollers, the points which before came
in contact with certain points of the rollers, come now
in contact with other points. By the above operations the
ink is supplied and distributed evenly upon the types.
To get a sufficient quantity of ink upon the rollers on
commencing work, it is necessary to let the press run
awhile without taking impressions.— After this the foun-
tain roller supplies each time it comes in contact with
the inking rollers as much ink as is taken off by inking
the types.— The fountain may be regulated to supply
more or less ink at pleasure by screwing or unscrewing
the caps which keep the fountain roller in its place
to the fountain.

6th. Throwing out of gear. Upon the middle of the West
side of the South great beam, I fix a notched piece of
cast iron which I call the hold fast, the open part of
which resembles in its appearance a boot jack.— It is
so fixed upon the beam that the two horns point to
the South one being directly over the other. The Eastern
end of the groove lever (as was said in a former part of this
specification) approaches very near the West side of the
great beam, and consequently it can be thrust to the
North, so as to enter between the horns of the hold
fast. I fix upon the West side of the South cheek
of the frame, vertically an iron lever 3 feet long its
fulcrum being a pin which is put through its middle into the frame, and which allows it a free revolving motion from North to South and the reverse. I fix by a moveable joint to the lower end of this lever (which is in the horizontal plane with the upper side of the hold fast) an iron bar which runs to the North, parallel with the lower great beam; and on the North end of the great beam a box is fixed in which the before described horizontal bar slides. — A bar of iron which I call the foot, which is about 8 inches long, firmly fixed to this horizontal bar, passes downwards from it at its middle part. The foot is curved a little, its concave side looking North, and it is always upon the South side of the groove lever, the holdfast being upon the North. It will be perceived that if the top of the vertical lever, first above described, be pulled towards the South, the slide bar & foot will will be carried to the North, and carry before it the East end of the groove lever, the weight (described in a former place) rising at the same time. The East end of the groove lever will thus be thrust between the horns of the hold fast, and these are so fixed as to guide it to a horizontal position. By this means the West end is brought out of the groove and the chuck or clutch upon the verged is unlocked from the pins in the verge wheels. In this state of things the revolution of the Cam shaft does not turn the verge nor move the bed. When it is desired to throw the groove lever into the groove, the bed should be drawn under the platen, and (watching the revolution of the Cam shaft) the East end of the groove lever should be suffered to slip from the hold fast, just as the cam meets the slide to give an impression.

A lever is hung directly under the ceiling or roof of the room, by a moveable joint near its middle.– The West end of this lever is directly over the slide which passes from the cam to the toggle joint, and is fixed to it at a point 1 foot from its West end, by a rod or chain, the East end of the lever is brought directly over the left hand of the pressman.– A rod having a proper handle hangs down from this end of the lever.– Nothing more is required than to pull the above rod downwards, (when it is required to stop taking impressions) this raises the Western end of the slide higher than the face of the Cam, which therefore passes under it without thrusting it forward.
The slide is kept out of its working place by hooking the aforesaid rod to a pin in the South cheek of the press.

In the foregoing specification I have described a great variety of wheels, levers, slides & other instruments which are common elements in all machines.– I do not pretend to have invented these, & hereby except them in their individual & simple characters, out of my claim for a patent. Neither do I claim a Patent for the platen the bed, the rails, the frisket, the inking rollers, the ink fountain or the body or frame of the press.
Neither do I claim a patent for making any of the parts of certain materials, or of certain sizes, as they may be varied without altering the character of my invention. Some of the subordinate combinations, herein described are not new, such as the combination of the toggle joint & platen, that of the verge and three wheels connected with it.– These therefore make no part of my invention.

I will now endeavour to state distinctly in what my invention consists.– I understand my invention to consist.—
1st of the combination and arrangement of the Cam shaft, Cam and slide, with the toggle joint & platen to produce the impression.
2nd I have taken the old combination of the verge, three wheels, chuck or clutch, pins & locking levers, and invented a combination of them with the eccentric spiral pulleys, and the bed. And further I have invented a combination of these with the main shaft, and the peculiar groove wheel which I have described, whereby certain necessary motions and certain states of rest are produced in regular succession and for definite periods. X
3rd I have invented the combination of the frisket with its slide, and the apron, and likewise the peculiar manner of arranging the tympan and blankets with them.
4th I have invented the combination of the rag-wheel with the fountain roller, and likewise that of the hinges and slides, by which the fountain roller is turned, and likewise brought into contact with the inking rollers.— I have likewise combined with the inking rollers, the revolving table and its appendages.
5th I have invented the combination herein described for throwing certain parts out of gear.
6th I have combined as (heretofore described) the several preceeding subordinate combinations into a general combination, in which they all have a certain dependence upon, and relation to, each other, necessary for the due performance of the whole.—

Under these six heads I have stated my whole invention, and I except from my claim
for a patent every thing in the preceding specifica-
tion, not embraced in the terms of this summary.—
In testimony that the foregoing is a true spec=
ification of my said improvement as herein descri=
bed, I have hereto set my hand and seal this twenty
eighth day of January in the year of our Lord eighteen
hundred & twenty six.

Daniel Treadwell.

Witnesses
Jason Braman
H. Whiting.

Patent Office Decr. 18. 1851
Received & recorded anew in this Office.

10.000 Exd [illegible]